United States Patent [19]
Inoue et al.

[11] Patent Number: 5,561,601
[45] Date of Patent: Oct. 1, 1996

[54] NON-MANIFOLD DATA STRUCTURE BASED NC MACHINING SIMULATION SYSTEM AND METHOD THEREOF

[75] Inventors: Keisuke Inoue, Sagamihara; Hiroshi Masuda, Yamato; Akira Okano, Sagamihara, all of Japan

[73] Assignee: International Business Machines Corporation, Armonk, N.Y.

[21] Appl. No.: 327,253

[22] Filed: Oct. 21, 1994

[30] Foreign Application Priority Data

Dec. 17, 1993 [JP] Japan .................................. 5-318545

[51] Int. Cl.$^6$ .............................. G06F 19/00; G06F 15/62
[52] U.S. Cl. ............................... 364/474.24; 395/120
[58] Field of Search ................. 364/474.24; 395/119, 395/120, 155

[56] References Cited

U.S. PATENT DOCUMENTS

| | | | |
|---|---|---|---|
| 4,785,399 | 11/1988 | Evans et al. | 395/156 |
| 4,833,617 | 5/1989 | Wang | 364/474.15 |
| 4,868,761 | 9/1989 | Hayashi | 364/474.24 |
| 4,890,242 | 12/1989 | Sinha et al. | 395/119 |
| 4,901,253 | 2/1990 | Iwano et al. | 395/119 |
| 5,014,230 | 5/1991 | Sinha et al. | 364/578 |
| 5,027,292 | 6/1991 | Rossignac et al. | 395/122 |
| 5,197,013 | 3/1993 | Dundorf | 364/474.24 |
| 5,278,983 | 1/1994 | Kawabe et al. | 395/120 |
| 5,351,196 | 9/1994 | Sowar et al. | 364/474.24 |
| 5,388,199 | 2/1995 | Kakazu et al. | 395/155 |

Primary Examiner—Paul P. Gordon
Attorney, Agent, or Firm—Calfee, Halter & Griswold

[57] ABSTRACT

Use of a non-manifold data structure enables retention of not only the interfaces between an entity in the process of being cut and a non-entity, but also the interfaces between entities or non-entities. These interfaces include the surfaces of substances (the boundaries between an entity and a non-entity) at intermediate points in time during a machining process represented by a series of Boolean operations, and the final or in-process interfaces obtained when machining (Boolean operations) is performed in a different sequence, and hence procedures following this method enable simulation to be retried at a low computation cost after a machining procedure is modified.

11 Claims, 7 Drawing Sheets

|     | PROCE-DURE 1 | PROCE-DURE 2 | PROCE-DURE 3 | ... |
|-----|------|------|------|-----|
| q1  | 1    | 3    | 4    |     |
| q2  | 2    | 2    | 5    |     |
| q3  | 3    | 5    | 6    |     |
| q4  | 4    | 6    | 1    |     |
| q5  | 5    | 1    | 2    |     |
| ⋮   | ⋮    | ⋮    | ⋮    |     |

WORKPIECE MODEL CREATION FLOW

INTERMEDIATE STATE ABSTRACTION/MACHINING

SEQUENCE MODIFICATION FLOW

MACHINING INFORMATION COMPUTATION FLOW

NON-MANIFOLD DATA STRUCTURE BASED NC MACHINING SIMULATION SYSTEM AND METHOD THEREOF

BACKGROUND OF THE INVENTION

1. Technical Field

This invention relates to the control of computer-aided machine tools, and more particularly an NC machining simulation system using a non-manifold data structure.

2. Description of the Prior Art

In machining parts by using an NC machine tool, it is necessary to select a curve on which to move the tool three-dimensionally. Hence, it is rather common for a machining designer to make corrections by repeating computer-aided simulation in the phase of tool path design prior to actual machining while running visual checks as to whether the final shape intended can be obtained, whether or not the cutting edge stays in stable contact with a shape to be cut during machining, whether or not there are redundant tool paths, and so on.

Machining simulation is largely divided into two types, i.e., geometrical simulation that evaluates changes in the shape of a workpiece with the travelling of a tool, and physical simulation that evaluates physical quantities such as cutting force, vibration, and heat varying in the course of machining. This invention deals chiefly with the former.

The geometrical simulation of machining employs a method in which the volume to be cut away by the intervention of the tool are deducted sequentially from a model in the original shape (unmachined shape) programmed into a computer beforehand by performing Boolean operations on the solid. Conventionally, these Boolean operations used to be performed on a boundary representation model, or what is called a solid model. However, this technique had restrictions in that only the surficial shape of a workpiece is obtained as a result of the simulation. Therefore, one must employ either (a) or (b) below if it is desired to check for time-serial changes in the shape:

(a) to observe gradual transformations of the model in question with the progress of computation (b) to copy onto another shape model as many transformations of the original shape as necessary during the actual process Method (a), on the one hand, takes too much time because the conventional technique allows data about in-process shapes to exist only at particular intermediate points of time in the course of Boolean operations and necessitates the performing of numerous Boolean operations, thus entailing a heavy workload in order to observe the progress of machining with precision. Method (b), on the other hand, necessitates the preparation of many copies of data, resulting in the disadvantage of massive data accumulation.

Moreover, in order to make even a partial change in the machining procedure or tool paths in reference to a simulation result, the conventional method entails either:

redoing a series of Boolean operations beginning with the original shape or performing reverse-Euler operations to reverse the steps where a series of Boolean operations were modified after recording the model transformational operations performed during the Boolean operations by performing Euler operations (An Euler operation is a transformational operation such that the expression $v-e+f=2(s-h)+r$ holds true where $v$=number of vertexes, $e$=number of edge lines, $f$=number of surfaces, $s$=number of connected components, $h$=number of through holes, and $r$=number of surficial holes. For details, refer to H. Chiyokura, "Solid Modeling with Design Base," Addison-Wesley, 1988, for example.)

However, both methods entail performing repeated Boolean operations and thus consume much in computation costs. Again, the more complex the machining process of parts is, the longer the time required for recomputation becomes.

PUPA 63-271578 deals with Boolean operations on three-dimensional bodies and related display methods for the simulation of the behavior of NC machine tools, and discloses that inputting a plurality of data elements defining a three-dimensional finite domain within three-dimensional finite space, dividing the fine space sequentially into segments until the data comes to meet particular conditions determined by a combination of data conditions representing a domain with an empty part and real part and conditions of data representing a real domain, generating data defining each of those segmented domains, and achieving Boolean operations on those two or more domains through performing Boolean operations on the data defining said segmented domains.

PUPA 1-292474 discloses the provision of an intersection detecting means for detecting mutual contact between the facets, edge lines, and vertexes of two solids in a three-dimensional solid interference arithmetic units for constructing solids by using Boolean operations and a coordinate shifting means for shifting the coordinates of facets, edge lines, and vertexes in directions in which the solids may expand or contract when some contact is detected by the intersection detecting means.

However, these techniques of the prior art do not provide processing efficiency high enough to facilitate the interactive designing/editing of tool paths.

PUPA 2-132573, with which this applicant is concerned here, does not necessarily enlighten us on the application of a boundary representation solid model using a non-manifold data structure to NC machining simulation, although it discloses such a system and hence provides a background technology for this invention.

The object of this invention is to enable machining simulation based on estimated tool paths to be carried out interactively at high efficiency in designing/editing tool paths for NC machine tools.

SUMMARY OF THE INVENTION

Embodiments of this invention include a system and method for computer aided, non-manifold data structure based NC machining and its simulation. The system provides shape data to be prepared about a workpiece model in its original shape and a tool path segment. This data is utilized and applied in a machining procedure which selects a solid to be swept on the basis of the tool shape data and the tool path segment corresponding to the pertinent tool. Non-manifold boundary representation data is generated by joining the solid to be swept with a workpiece model in process. The cells occurring outside the workpiece model are erased. Current boundary data is used to determine whether or not a component of said non-manifold boundary representation data is a current boundary. If so, it is marked as the pertinent boundary.

Other features and advantages of this invention will become apparent from the following detailed description of

DETAILED DESCRIPTION OF THE PREFERRED EMBODIMENT

Overview

According to this invention, a workpiece is represented as a non-manifold data structure. Insofar as a boundary representation model normally represents one solid by interfaces separating entities from non-entities, only the final shape of a workpiece to be carved out is obtained at the end of simulation using a boundary representation model. Hence, it is necessary to redo calculations form the beginning when simulations retried after a machining procedure is modified.

Yet, the use of a non-manifold data structure entails retaining not only interfaces separating an entity from a non-entity but also interfaces separating one entity/non-entity from another. These interfaces include the surfaces of bodies (the boundaries between entities and non-entities) at intermediate points of time in a machining process represented by a series of Boolean operations, and the final or in-process interfaces which have been machined or have undergone Boolean operations. By following procedures of this invention, it becomes possible to retry simulation after a machining procedure is modified.

In other words, when a non-manifold data structure is used for NC machining simulation, the final model that has gone through all machining steps includes a large amount of data. Hence, once such a final model is obtained, it becomes possible to extract a shape at an intermediate point in time during machining at high speed, or a shape through a quite different sequence.

A Non-Manifold Data Structure and its Pertinent Boolean Operations

Shapes in conventional boundary representation capable of being handled by solid models are mathematically termed two-dimensional manifolds (2-manifolds). On the other hand, shapes incapable of being represented through conventional boundary representation, e.g., ones such that one edge line is shared with three or more facets, are generally termed non-manifolds in the CAD field.

One advantage of non-manifolds is said to be that they can represent space segmentation. Here, we call such space segments cells. Also, we call a shape segmented into cells a cell segmentation model.

Figure 1:
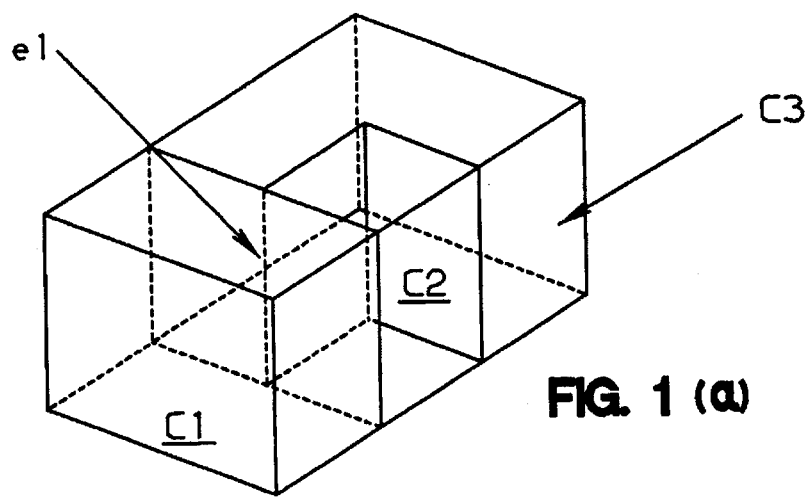
FIG. 1 shows a cell segmentation model.
Figure 1:
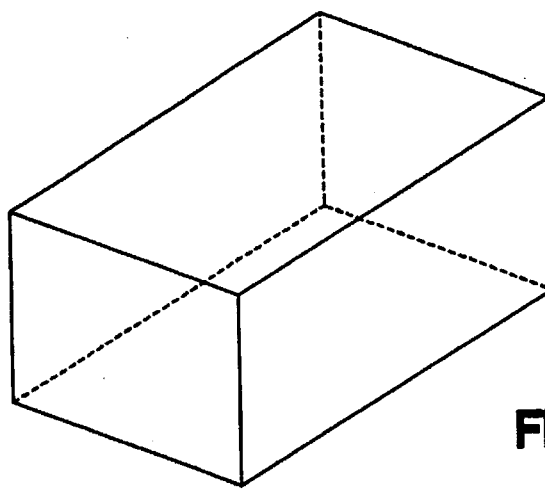
Figure 1:
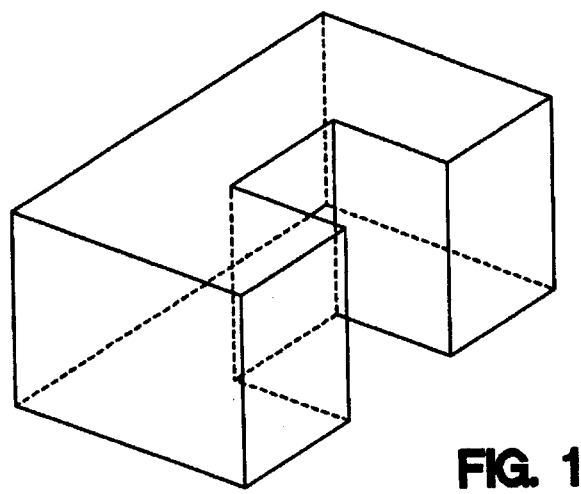

FIG. 1(a) shows an example of a cell segmentation model. Such a cell segmentation model is non-manifold, because the edge line, e1, in FIG. 1(a) is shared with three facets.

One advantage of cell structure models is that the structure can include two or more solids. That is, it is possible to make a boundary representation solid model by determining the boundaries of some cells within a cell structure model. FIGS. 1(b) and 1(c) show shapes generated by selecting {C1, C2, C3} and {C1, C3} respectively from cells C1, C2, and C3 and eliminating their boundaries.

Figure 2:
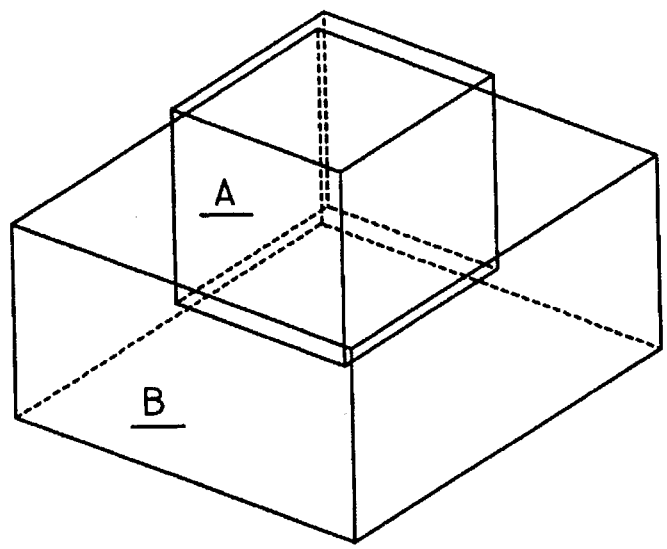
FIG. 2 shows the creation of a cell segmentation model suing elementary solids.
Figure 2:
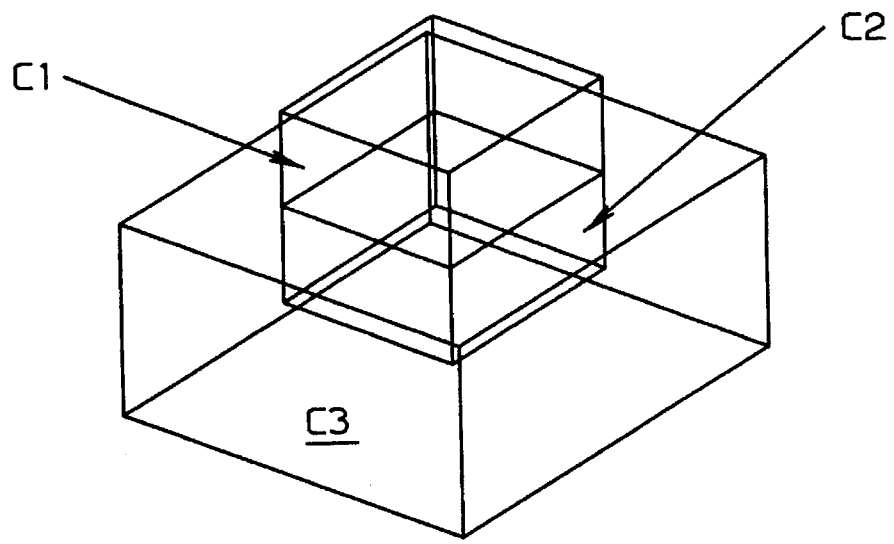

A cell structure can be created by merging solids with one another. Here, we call solids A and B units on which such operations as cancellation and alteration elementary solids are performed. FIG. 2 shows a cell structure created by merging solid A with solid B. In this example, three cells C1, C2, and C3 are formed by merging solid A with solid B. Either or both of the objects to be operated on may be an elementary solid or a cell structure. In a cell segmentation model created by merging, each elementary solid corresponds to a set of several cells.

In this case, we obtain the following cell list:

[Formula 1]

$$A \to \{C1, C2\}, B \to \{C2, C3\}$$

On the other had, from the knowledge of which elementary solid each cell belongs to, we can define such correspondence as shown below:

[Formula 2]

$$C1 \to \{A\}, C2 \to \{A, B\}, C3 \to \{B\}$$

Since such correspondence is defined in the phase of merging, a list like the above needs to be retained with respect to all cells and elementary solids. From this representation we can easily derive sums, differences, and products between elementary solids. For instance, if the difference between solids A and B is defined as

[Formula 3]

$$A-B=\{C1, C2\}-\{C2, C3\}=\{C1\},$$

we can easily derive a resulting shape by Boolean operations.

Moreover, an explanation of anther non-manifold data structure and its relevant Boolean operations is provided in: PUPA 2-132573. Again, as to non-manifold data structures, detailed descriptions are provided in: H. Chiyokura, "Solid Modeling with Design Base," Addison-Wesley, 1988 and H. Masuda, K. Shimada, M. Numao, and S. Kawabe, "A Mathematical Theory and Applications of Non-Manifold Geometric Modeling," "Advanced Geometric Modeling for Engineering Applications," North-Holland, November 1989.

A Workpiece Model on a Non-Manifold Structure

When machining simulation is carried out by using a solid model in conventional boundary representation, we usually employ the following method:

[Formula 4]

$$W_1 = W_0 - p_0$$

$$W_2 = W_1 - p_1$$

$$\ldots$$

$$W_n = W_{n-1} - p_{n-1}$$

letting a solid in original shape, a solid to be swept by a tool, and a solid model in the in-process shape be $W_0$, $p_i$ and $W_i$, so that the volume to be cutaway is deducted from the solid in sequence by differential operations.

Figure 3:
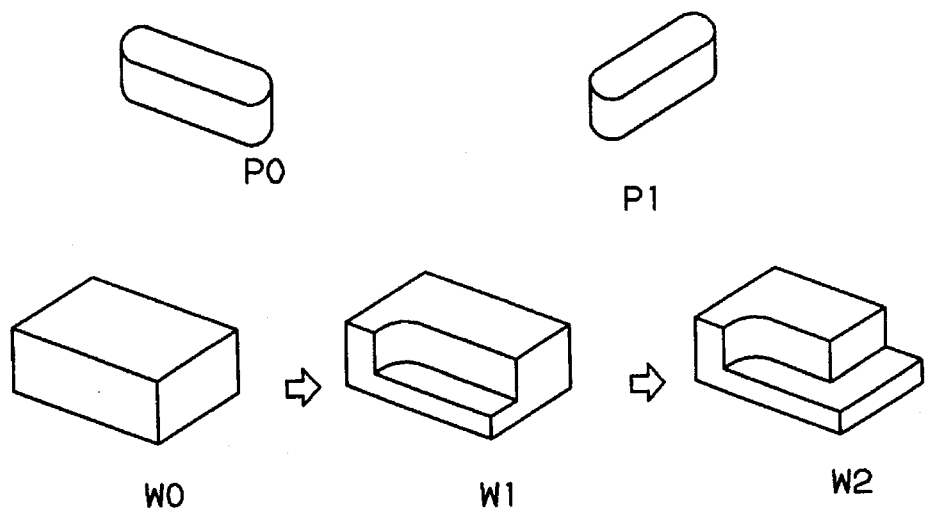
FIG. 3 shows a sequence of machining simulation using a conventional solid model.

On this occasion, each tool path is segmented in advance and $p_i$ corresponds to each segment. The shape model then metamorphoses as shown in FIG. 3. To determine an in-process solid, $W_i$, after modifying a machining procedure instead of employing the above direct method, it is necessary to redo differential Boolean operations from the beginning.

To use a non-manifold structural model according to this invention, we follow the procedure below:

[Formula 5]

$$W'_1 = W_0 - q_0(q_0 = p_0 \cap {}^*W_0)$$

$$W'_2 = W'_1 - q_1(q_1 = p_1 \cap {}^*W'_1)$$

...

$$W'_n = W'_{n-1} - q_{n-1}(q_{n-1} = p_{n-1} \cap {}^*W'_{n-1})$$

Where $q_1$ denotes a solid to be generated by the set operation $\cap^*$ for machining simulation, the solid being defined by the following steps:

(a) merge $p_i$ with $W'_i$ (b) delete the cells inside $p_i$ and outside $W_0$ from the resulting cell structure (c) let a solid composed of the undeleted cell set of the cells constituting $p_i$ be a new elementary solid, $q_1$ In practice, the product operations parenthesized and the difference operations are performed in parallel.

A solid to be deducted was here defined not as $p_i$ but as $q_i = p_i \cap {}^*W_0$ so as to prevent computation costs from increasing on account of interference calculations entailed by needless space segmentation in the domain outside the original shape.

Figure 4:
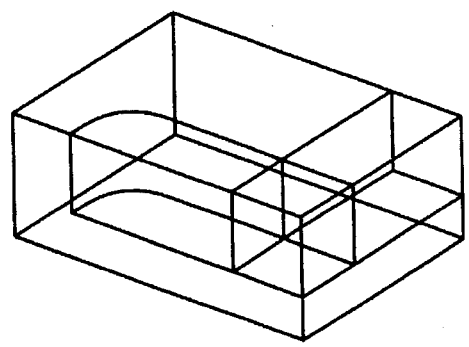
FIG. 4 shows an example of the cell structure of a non-manifold model.

FIG. 4 shows an example of a cell structure, $W'_n$, obtained in this way. From this figure we can readily see that the inside of the original shape is of a complex segmented cell structure. Since as we can easily locate each cell, whether on the entity side or on the non-entity side, by applying the method described later, it is evident that $W'_n$ denotes the same solid as $W_n$ defined by applying the conventional technique.

Abstraction of an In-Process Model

A shape model in the final state, $W'_n$, obtained following the above-described procedure includes much information. The following explains how to abstract the shape of a workpiece at a point of time, $i$, (when the machining of segment i ends) by using $W'_n$ alone.

As already described, each cell of $W'_n$ retains a list of the elementary solids in which the cell is included, e.g.: $\{W'_n, q_1, q_3, q_6\}$. Now, letting a list of the elementary solids in which a certain cell is included be $\{W_0, q_{t1}, q_{t2}, \ldots q_{tm}\}$, we shall consider the condition where the cell is situated on the non-entity side at a point of time, $i$.

Insofar as the cell ceases to be an entity when any of the set $q_{t1}, q_{t2}, \ldots q_{tm}$, is cut away, the condition is expressed as follows:

[Formula 6]

$$(\forall j)\ (1 \leq j \leq m \Rightarrow t_j > i)$$

Where the condition $t_j > i$ corresponding to $q_{tj}$ still remains uncut at a point in time, $i$. It is possible to discriminate the cells of a workpiece at any point of time, $i$, and thus to abstract the shape of the workpiece by giving a decision as to the above condition regarding each cell.

Likewise, it is also possible to abstract a solid to be cut away by machining. The condition under which such an elementary solid is cut away first by the i-th tool path segment is as follows:

[Formula 7]

$$(\forall j)\ (1 \leq j \leq m \Rightarrow t_j > i-1) \land \neg (\forall j)\ (1 \leq j \leq m \Rightarrow t_j > i)$$

This condition can be transformed to the following:

[Formula 8]

$$\min_{1 \leq j \leq m} (t_j) = i$$

Thus, it is possible to easily abstract a volume to be cut away by each segment during machining as set of cells, and the volume is calculated as the sum of the volumes of cells belonging to the set.

For details of techniques for compiling a list of elementary solids including a cell by a series of operations, such as $W'_n = W'_{n-1} - q_{n-1}$, refer to PUPA 2-132573, which relates to this applicant.

Modification of Machining Procedures Using a Procedural Table

Once a machining sequence in the design of a tool cutting path (the sequence in which a tool path segment is cut) is modified, cutting accuracy is affected by a volume to be cut away be each segment, cutting force, cutting rates, heat generation due to cutting, cooling condition, and thermal deformation, even though the final shape may be the same. Hence, it is necessary to optimize machining procedures after replacing the machining sequence of each part with another even after tool loci have been decided geometrically.

As a further development of the method explained above, the following explains how to carry out high-speed machining simulation with a machining procedure modified by using $W'_n$ determined above.

For this purpose, we shall first prepare a procedural table (see FIG. 5) of correspondences between tool path segments and machining order. The procedure 1 column corresponds to the procedure for making $W'_n$ first.

Then, suppose that simulation is carried out following procedure 2, similarly to that following procedure 1.

According to this invention, a cell structure, $W'_n$, once made, is able to be used again for this purpose and the need to redo geometric calculation is thus obviated.

Provided that the contents of each row of the procedure 2 column in the procedural table are represented as, e.g., (order2($q_1$)=3), the condition that $q_{tj}$ is not yet cut away at a point of time, $i$, can be transformed to order2($q_{tj}$)>$i$.

[Formula 9]

$$\{W_0, q_{t1}, q_{t2}, \ldots q_{tm}\}$$

Therefore, the condition under which a cell with the above list of elementary solids is situated on the entity side in procedure 2 at a point in time, $i$, is represented as follows:

[Formula 10]

$$(\forall j)\ (1 \leq j \leq m \Rightarrow \text{order2}\ (q_{ij}) > i)$$

Also, the condition on which the cell is cut away first by the i-th tool path segment is represented as follows:

[Formula 11]

$$\min_{1 \leq j \leq m}\ (\text{order2}(q_{ij})) = i$$

Thus, machining simulation following a new procedure is achieved by simply collating a cell structure obtained as a result of simulation following (1) a certain procedure with (2) the new procedure.

A System Configuration for Implementing This Invention

Figure 6:
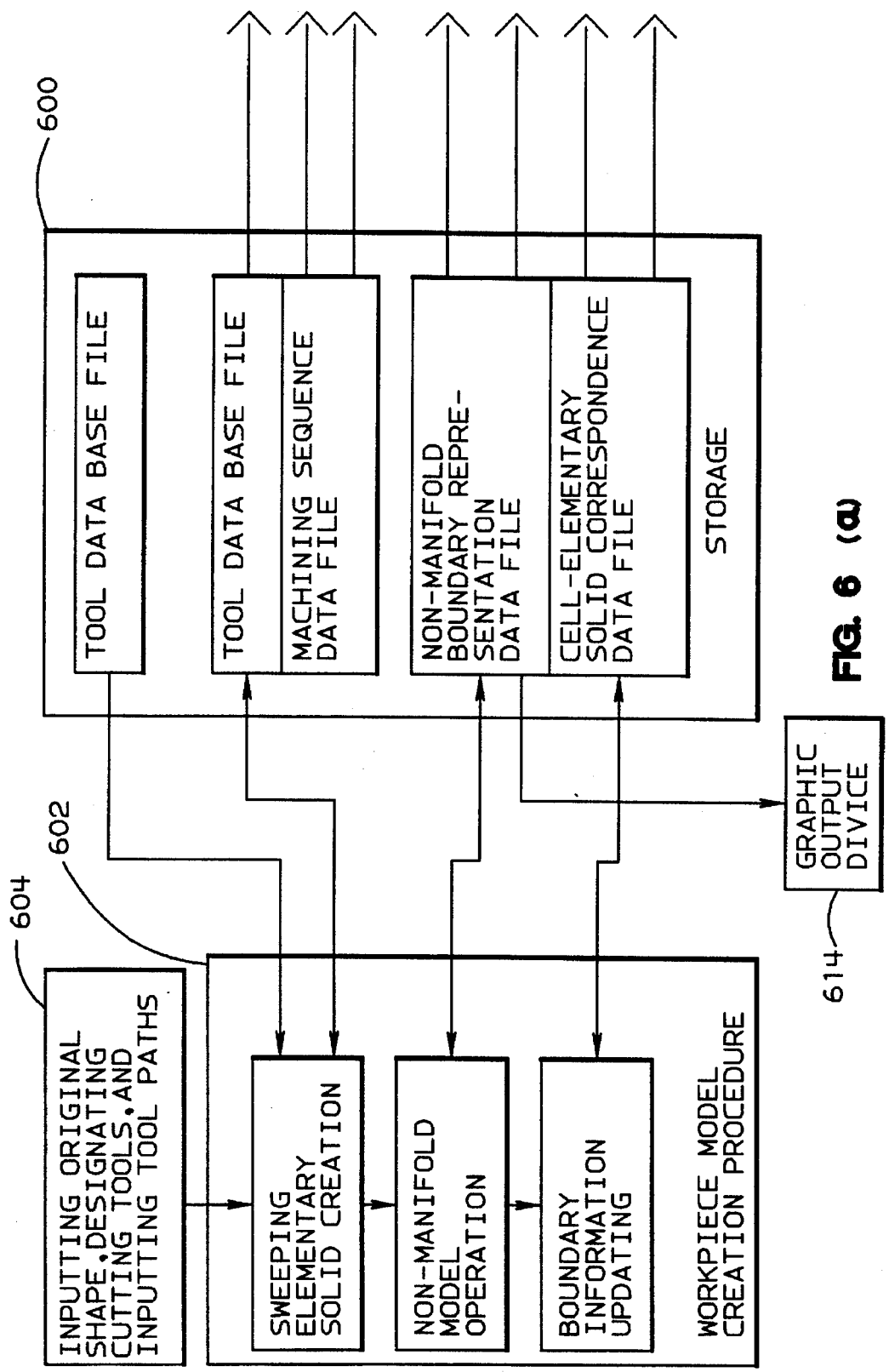
FIG. 6 is a block diagram of a system of this invention.
Figure 6B:
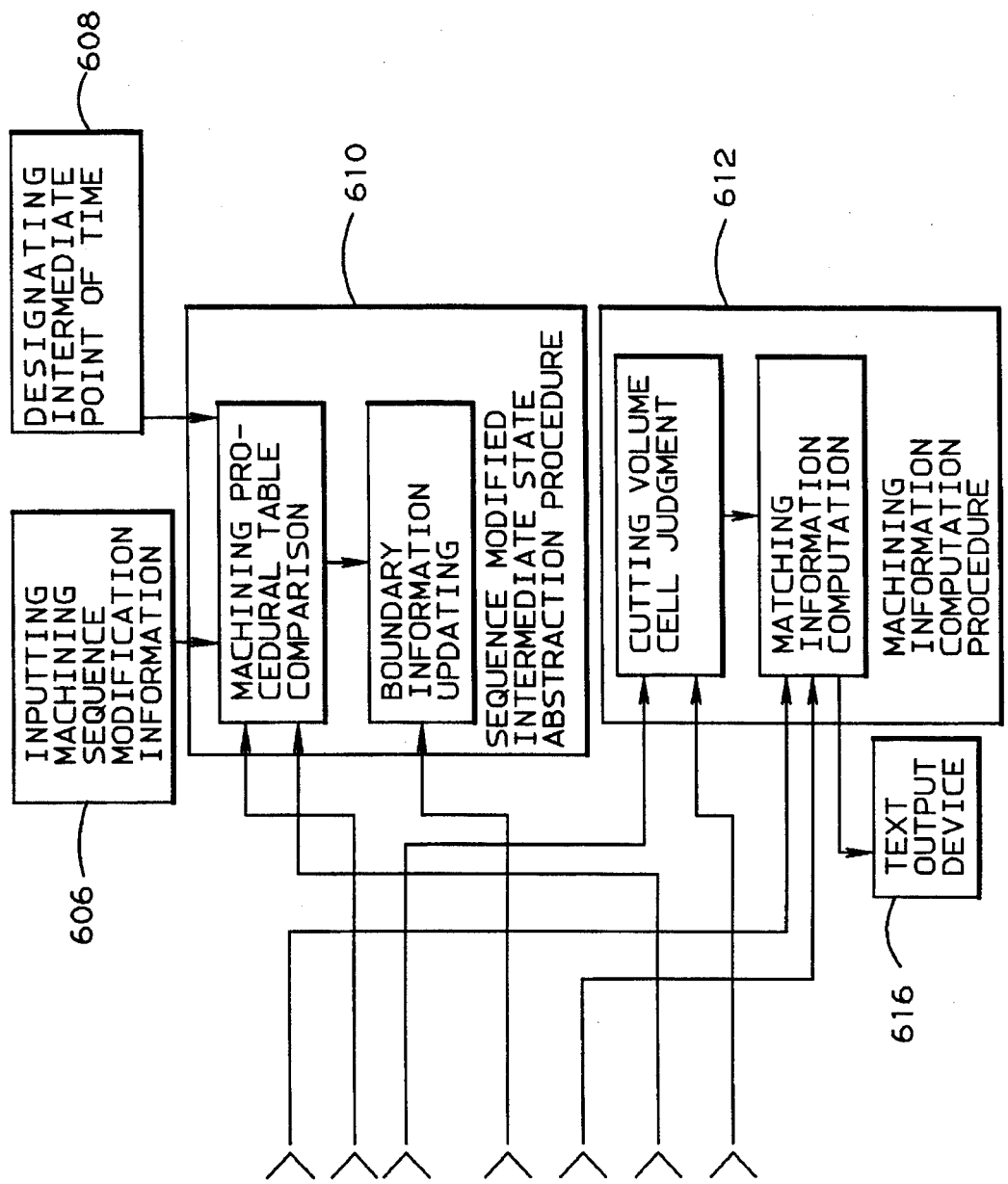

FIG. 6 is a block diagram of a system configuration for implementing this invention. In FIG. 6, there is magnetic disk storage 600 storing a tool data base file containing data concerning the sizes and shapes of various tools, a tool path data file storing data concerning tool paths, a non-manifold boundary representation data file storing data for use in calculating a non-manifold model, and a data file storing sequential correspondences between cells and elementary solids. The non-manifold boundary representation data file and the data file storing sequential correspondences between cells and elementary solids are work files for computation and may be loaded in to the main storage.

That which is signified by a block 602, is an arithmetic module including workpiece model creation procedures, and it is normally stored in magnetic disk storage (not illustrated). This block is loaded in main storage when a system of this invention is run. An arithmetic module 602, has a sweeping elementary solid creation submodule, a non-manifold model operation submodule, and a boundary information updating submodule. The sweeping elementary solid creation submodule receives data from a block 604 accepting the input of original shape data, cutting tool designations, and tool paths by an operator, reads the data from the tool database according to the data thus received, and writes the tool paths thus input onto the magnetic disk storage 600.

Figures 5, 7:
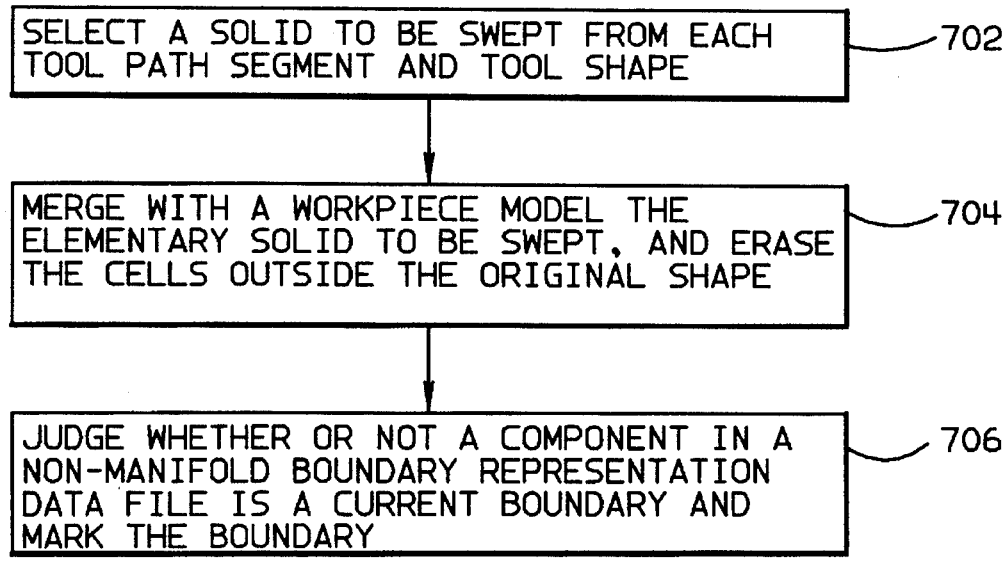
FIG. 5 shows a machining procedural table.
FIG. 7 shows the steps of workpiece model creation.

The block 602 performs the processing shown in FIG. 7. That is, in step 702 of FIG. 7, the sweeping elementary solid creation submodule performs the process for determining a solid to be swept from the tool path segment and the tool shape. In step 704, the non-manifold model operation submodule merges an elementary solid to be swept with a workpiece model and erases cells occurring outside the original shape. In step 706, the boundary information updating submodule judges if a component in the non-manifold boundary representation data file is a current boundary and marks the boundary if so.

Figure 8:
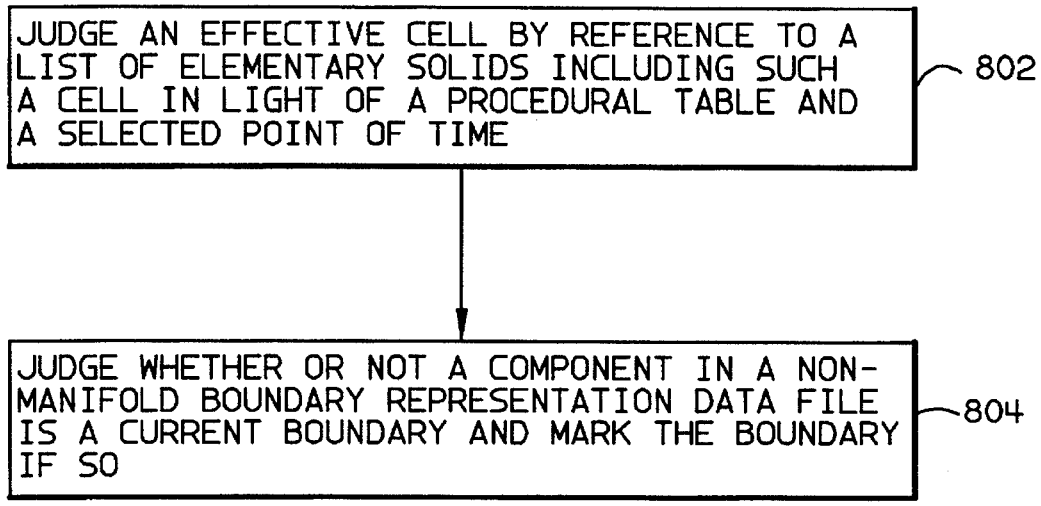
FIG. 8 shows the steps of intermediate state abstraction and machining procedure modification.

A block 610, has a machining procedure table comparison submodule and a boundary information updating submodule, modifies a machining sequence, and abstracts intermediate states according to machining sequence modification information input via the blocks 606 and 608 and the designation of intermediate points of time by an operator. The block 610 performs the processing shown in FIG. 8. That is, in step 802, the machining procedure table comparison submodule refers to a list of elementary solids based on the machining procedural table and a selected point in time and judges if the cell is effective. In step 804, the boundary information updating submodule judges whether or not a component in the non-manifold boundary representation data file is a current boundary and marks the boundary if so. This processing is the same as that performed by the boundary information updating submodule in the block 602. Hence, the boundary information updating submodule may be shared by the blocks 602 and 610.

Figure 9:
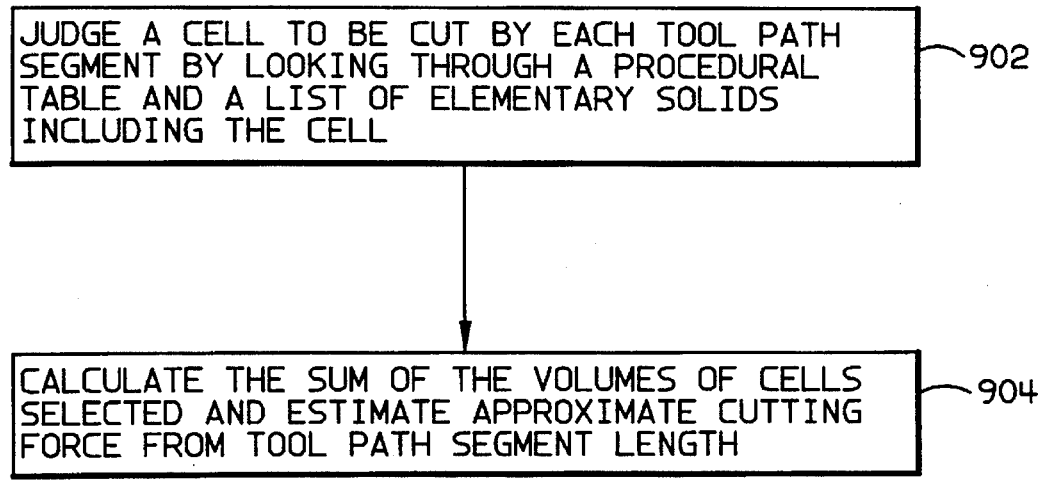
FIG. 9 shows the steps of machining information computation.

A block 612 takes charge of physical calculations relating to machining, and contains a cutting volume cell determination submodule and a machining information computation submodule. The block 612 performs the processing shown in FIG. 9. That is, in step 902, the cutting volume cell judgement submodule judges the segment to be cut by each tool path segment by referring to a machining procedural table and a list of elementary solids including a cell. In step 904, the sum of the volumes of cells to be deleted by the tool path segment thus selected is calculated and the approximate cutting force is estimated from the tool path segment length.

This system furthermore has a graphic output device 614 and a text output device 616. The graphic output device 614 receives data from the non-manifold boundary representation data file and graphically displays cutting shapes obtained at intermediate points of time or a final point of time designated by the intermediate time designation block 608. The text output device 616 is connected to the machining information computation submodule of the block 612 and displays numerical values, such as cutting force and the cutting volumes of cells calculated and output by the machining information computation submodule.

Advantages over the Prior Art

As has been described above, this invention provides the manifest effect of not only facilitating the calculation of the total volume of entity cells in the process of being cut and the display of in-process shapes by retaining the results of cutting as a non-manifold data structure, but also helping operators interactively find optimum machining procedures by reducing workload through performing logic operations on a list of elementary solids including each cell without performing repeated geometric Boolean operations when cutting simulation is carried out after a machining procedure is modified, and thus quickly feeding back results of simulation regarding the modified machining procedure.

It will be appreciated that, although specific embodiments of the invention have been described for purposes of illustration, various modifications may be made without departing from the spirit and scope of the invention. Accordingly, the scope of protection of this invention is limited only by the following claims and their equivalents.

We claim:

1. A method for computer-aided, non-manifold data structure based NC machining simulation comprising the steps of:

(a) preparing shape data about a workpiece model in its original shape;

(b) providing a machining procedure for applying tool shape data and data about a tool path segment corresponding to a pertinent tool; wherein said step comprises the steps of:

(1) reading tool shape data, cutting tool designations data and tool path segment data;

(2) reading tool database data based on said tool shape data, cutting tool designations data and tool path segment data; and (3) generating a machining procedure table comprising tool path segment data and machining order data;

(c) generating a solid to be swept on the basis of said tool shape data and said data about said tool path segment corresponding to the pertinent tool in said machining procedure;

(d) generating non-manifold boundary representation data by joining said solid to be swept with said workpiece model in process and erasing cells occurring outside said workplace model in original shape;

(e) determining whether or not a component of said non-manifold boundary representation data is a current boundary, and making a pertinent boundary if the component is the current boundary; and (f) repeating said steps (c) to (e) until the completion of said machining procedure.

2. The method according to claim 1, further comprising the step of calculating a remaining uncut shape of said workpiece by checking a boundary of the non-manifold boundary representation data at a definite point in time.

3. The method according to claim 2, wherein said definite point in time is set by an operator at an intermediate point in time preceding the end of a machining procedure.

4. The method according to claim 1, further comprising the step of selecting the solid to be eliminated first by a corresponding tool path segment at a definite point in time and determining a cutting force by calculating the volume of the solid.

5. The method according to claim 1, further comprising the steps of:

(g) providing a machining procedure different from said machining procedure for said tool shape data and said data concerning said tool path segment corresponding to the pertinent tool; and (h) determining whether or not a component of non-manifold boundary representation data in said non-manifold data structure finally generated following said different machining procedure is a current boundary and skipping the step of calculating non-manifold boundary representation data again by marking the pertinent boundary if the component is the current boundary.

6. The method according to claim 5, further comprising the step of calculating a remaining uncut shape of said workpiece by checking a boundary of the non-manifold boundary representation data at a definite point in time.

7. The method according to claim 5, further comprising the step of selecting the solid to be eliminated first by a corresponding tool path segment at a definite point in time and determining a cutting force by calculating the volume of the solid.

8. The method according to claim 5, wherein said definite point in time is set by an operator at an intermediate point in time preceding the end of a machining procedure.

9. A computer-aided, non-manifold data structure based NC machining simulation system comprising:

(a) logic for providing shape data about a workpiece model in its original shape;

(b) logic for providing a first machining procedure for applying tool shape data and data about a tool path segment corresponding to a pertinent tool; said logic comprises:
  (1) logic for reading said tool shape data, cutting tool designations data and tool path segment data;
  (2) tool database logic for storing and retrieving said tool shape data, cutting tool designations data and tool path segments data; and
  (3) logic for generating a machining procedure table comprising tool path segment data and machining order data;

(c) selecting logic for selecting a solid to be swept on the basis of said tool shape data and said data concerning said tool path segment corresponding to the pertinent tool in said first machining procedure;

(d) generation logic for generating non-manifold boundary representation data by joining said solid to be swept with said workpiece model in process and erasing cells occurring outside said workpiece model in its original shape;

(e) determination logic for determining whether or not a component of said non-manifold boundary representation data is a current boundary, and marking a pertinent boundary if the component is the current boundary; and (f) control logic for controlling said selection logic, generation logic, and determination logic, following said first machining procedure.

10. The machining simulation system according to claim 9, further comprising a second machining procedure different from said first machining procedure in reference to said tool shape data and data about a tool path segment corresponding to the pertinent tool, and logic for calculating non-manifold boundary representation data once again without using said generation logic by determining whether or not a component of the non-manifold boundary representation data in said non-manifold data structure finally generated following said first machining procedure is a current boundary following said second machining procedure, and marking the pertinent boundary if the component is the current boundary.

11. The machining simulation system according to claim 10, further comprising a display for graphically displaying the shape of said workpiece at the pertinent point in time in response to an operator's instruction on the basis of said marked boundary of said non-manifold boundary representation data at the pertinent point in time.

* * * * *

UNITED STATES PATENT AND TRADEMARK OFFICE
CERTIFICATE OF CORRECTION

PATENT NO. : 5,561,601
DATED : October 1, 1996
INVENTOR(S) : Inoue, et al.

It is certified that error appears in the above-indentified patent and that said Letters Patent is hereby corrected as shown below:

Col. 9, ln. 8: please change "workplace" to --workpiece--

Col. 9, ln. 11: "making" should be changed to --marking--

Col. 10, ln. 13: "segments" should be changed to --segment--

Signed and Sealed this

Seventeenth Day of December, 1996

Attest:

BRUCE LEHMAN

*Attesting Officer*     *Commissioner of Patents and Trademarks*